United States Patent
Kotani

(10) Patent No.: US 8,279,297 B2
(45) Date of Patent: Oct. 2, 2012

(54) IMAGE PROCESSING APPARATUS, IMAGE PROCESSING METHOD, AND STORAGE MEDIUM

(75) Inventor: Takuya Kotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 12/950,394

(22) Filed: Nov. 19, 2010

(65) Prior Publication Data

US 2011/0157396 A1    Jun. 30, 2011

(30) Foreign Application Priority Data

Dec. 28, 2009   (JP) ................................. 2009-298823

(51) Int. Cl.
*H04N 5/225* (2006.01)
*H04N 5/228* (2006.01)
*H04N 7/00* (2011.01)

(52) U.S. Cl. ..................... 348/218.1; 348/222.1; 348/36
(58) Field of Classification Search .................. None
See application file for complete search history.

(56) References Cited

U.S. PATENT DOCUMENTS

| | | | | |
|---|---|---|---|---|
| 5,528,290 A | * | 6/1996 | Saund | 348/218.1 |
| 5,668,631 A | | 9/1997 | Norita et al. | |
| 6,720,997 B1 | * | 4/2004 | Horie et al. | 348/218.1 |
| 7,268,803 B1 | * | 9/2007 | Murata et al. | 348/218.1 |
| 2002/0122117 A1 | * | 9/2002 | Nakagawa et al. | 348/218 |
| 2002/0186425 A1 | * | 12/2002 | Dufaux et al. | 358/497 |
| 2003/0044048 A1 | * | 3/2003 | Zhang et al. | 382/107 |
| 2004/0056966 A1 | * | 3/2004 | Schechner et al. | 348/229.1 |
| 2010/0295954 A1 | | 11/2010 | Kotani | |

FOREIGN PATENT DOCUMENTS

JP          07-174538 A      7/1995

* cited by examiner

*Primary Examiner* — Justin P Misleh
(74) *Attorney, Agent, or Firm* — Fitzpatrick, Cella, Harper & Scinto

(57) ABSTRACT

The invention provides an image processing apparatus comprising: an acquisition unit configured to acquire a plurality of captured images captured by an image capturing apparatus; a determination unit configured to determine position information of the image capturing apparatus for each of the plurality of captured images so that an evaluation value becomes smaller; and a connecting unit configured to connect the plurality of captured images projected onto a reconstruction plane using the determined position information of the image capturing apparatus, wherein the determination unit comprises a calculation unit configured to project each of the plurality of captured images onto the reconstruction plane based on the set position information and to calculate, as the evaluation value, an image difference between the projected images in a overlapping region between the projected images.

10 Claims, 14 Drawing Sheets

IMAGE PROCESSING APPARATUS, IMAGE PROCESSING METHOD, AND STORAGE MEDIUM

BACKGROUND OF THE INVENTION

1. Field of the Invention

The present invention relates to an image processing apparatus and image processing method that capture an object that is larger than a view of an image capturing apparatus by a plurality of times to obtain a captured image of the entire object.

2. Description of the Related Art

An electric panhead has been conventionally known as a device that is attached between a tripod and a camera and used to electromotively rotate the camera, which is set in its upper portion, through a predetermined angle. In recent years, a system which captures a plurality of images while changing the orientation of the image capturing camera by driving the electric panhead, and connects the captured images to each other, thereby generating an image (for example, a panoramic image) with a very large number of pixels is attracting a great deal of attention. A most serious challenge in such an image capturing system is an image connection process of the captured images. In a technique known as the image connection process, adjacent images are estimated in accordance with the degree of similarity between their edges, and are connected together. However, if the object is captured as images that have uniform regions or are partially even and therefore have little difference between them, it is very difficult to correctly specify adjacent images such that a satisfactory connection result can not be obtained with this technique. Also, because different errors are generated in respective captured images due to the influence of, for example, the lens aberration and the object perspective, if a simple comparison is insufficient to obtain correct corresponding points, no appropriate connection result may be obtained either.

Under the circumstance, to calculate the correct corresponding points, a technique to perform the following coordinate transformation, for example, has been proposed (see, for example, Japanese Patent Laid-Open No. 07-174538). According to this technique, first, based on a plurality of image data, the relative rotation angle between an object and an input means, and the position of the rotation axis of an image capturing apparatus, are calculated as coordinate transformation parameters used to connect the plurality of image data. Next, based on the calculated coordinate transformation parameters, the target images are coordinate-transformed to those in one coordinate system and composited.

To prevent the influence of the difference in luminance for each image data upon composition, a method of comparing the second-order derivative of each pixel has also been proposed, instead of simply calculating the differences between these image data in portions in which they overlap each other, in order to obtain corresponding points.

However, according to the coordinate transformation technique disclosed in Japanese Patent Laid-Open No. 07-174538, corresponding points in regions in which adjacent images overlap each other are obtained, and a process of connecting these images is performed. For this reason, images including fine repetitive patterns, such as a mounting of a hanging scroll, may not be able to be correctly connected to each other. To cope with this situation, images can be deformed/connected without obtaining corresponding points. Nevertheless, in this case, so-called lens aberration correction must be adopted, where the lens distortion, the vignetting, and the magnification chromatic aberration, for example, are corrected. An error of the captured image, which is generated by the lens aberration, variously changes depending on the object distance (shooting distance). Hence, a method of calculating the relative position between images, as in Japanese Patent Laid-Open No. 07-174538 mentioned above, is insufficient to appropriately correct this error, so the object distance for each image or the camera position in image capture must be correctly estimated.

Also, appropriate perspective correction cannot be performed by simply adopting coordinate transformation such as rotation/translation for the captured images. For appropriate perspective correction, again, the camera position in image capture must be appropriately estimated.

Furthermore, when vignetting correction is adopted in accordance with camera settings in image capture, the amount of noise increases in a direction away from the image center. Upon adopting such correction, even the method of using a second-order derivative, mentioned above, is insufficient to eliminate the influence of the luminance.

SUMMARY OF THE INVENTION

The present invention has been made in order to solve the above-mentioned problems, and provides an image processing apparatus and image processing method having the following function. That is, a plurality of captured images obtained by divided capture of an object are connected appropriately to each other by appropriately estimating the camera position in image capture for each of the plurality of images, and performing their lens aberration correction and perspective correction corresponding to this camera position.

According to one aspect of the invention, an image processing apparatus comprises: an acquisition unit configured to acquire a plurality of captured images captured by an image capturing apparatus, wherein a captured area for each of the plurality of captured images overlaps with a captured area for at least another one of the plurality of captured images; a determination unit configured to determine position information of the image capturing apparatus, which has captured the plurality of captured images, for each of the plurality of captured images so that an evaluation value becomes smaller; and a connecting unit configured to connect the plurality of captured images projected onto a reconstruction plane using the determined position information of the image capturing apparatus, wherein the determination unit comprises a setting unit configured to set the position information of the image capturing apparatus for each of the plurality of captured images, and a calculation unit configured to project each of the plurality of captured images onto the reconstruction plane based on the set position information, and further configured to calculate, as the evaluation value, an image difference between the projected images in a overlapping region between the projected images, and the determination unit is further configured to calculate the evaluation value while changing the position information of the image capturing apparatus.

According to the present invention having the above-mentioned configuration, a plurality of captured images obtained by divided capture of an object can be appropriately connected to each other by appropriately estimating the camera position in image capture for each of the plurality of images, and performing their lens aberration correction and perspective correction corresponding to this camera position.

Further features of the present invention will become apparent from the following description of exemplary embodiments with reference to the attached drawings.

DESCRIPTION OF THE EMBODIMENTS

Embodiments of the present invention will be described below with reference to the accompanying drawings. Note that the following embodiments do not limit the present invention which will be defined in claims, and not all combinations of features described in these embodiments are indispensable for solving means of the present invention.

<First Embodiment>

Apparatus Configuration

Figure 1:
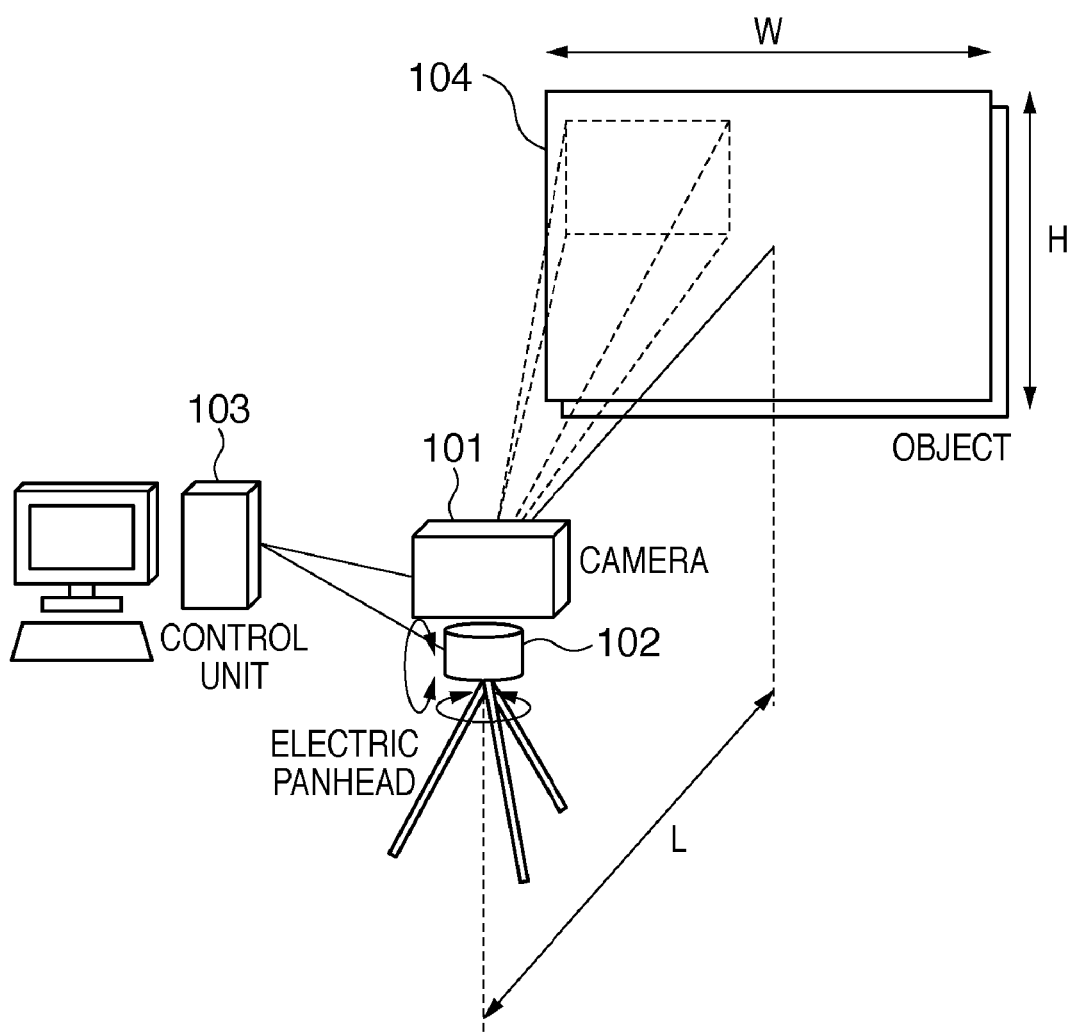
FIG. 1 is a view showing the configuration of an image capturing system according to the first embodiment.

FIG. 1 is a view showing the configuration of an image capturing system according to this embodiment. Referring to FIG. 1, reference numeral 101 denotes a camera as the main body of an image capturing apparatus in this embodiment; and 102, an electric panhead. As shown in FIG. 1, the camera 101 is mounted on the electric panhead 102, and the body of the camera 101 is panned and tilted by rotating the electric panhead 102. Thus, the camera 101 captures an object. Reference numeral 103 denotes a control unit which controls the operation of the camera 101 and the rotational operation of the electric panhead 102. The control unit 103 also functions as an image processing apparatus which performs a connection process of captured images obtained by capturing an object by the camera 101 to generate an ultrahigh-resolution image. Reference numeral 104 denotes an object which is to be captured, which has a width W and a height H and is spaced apart from the camera 101 by a distance L.

Figure 2:
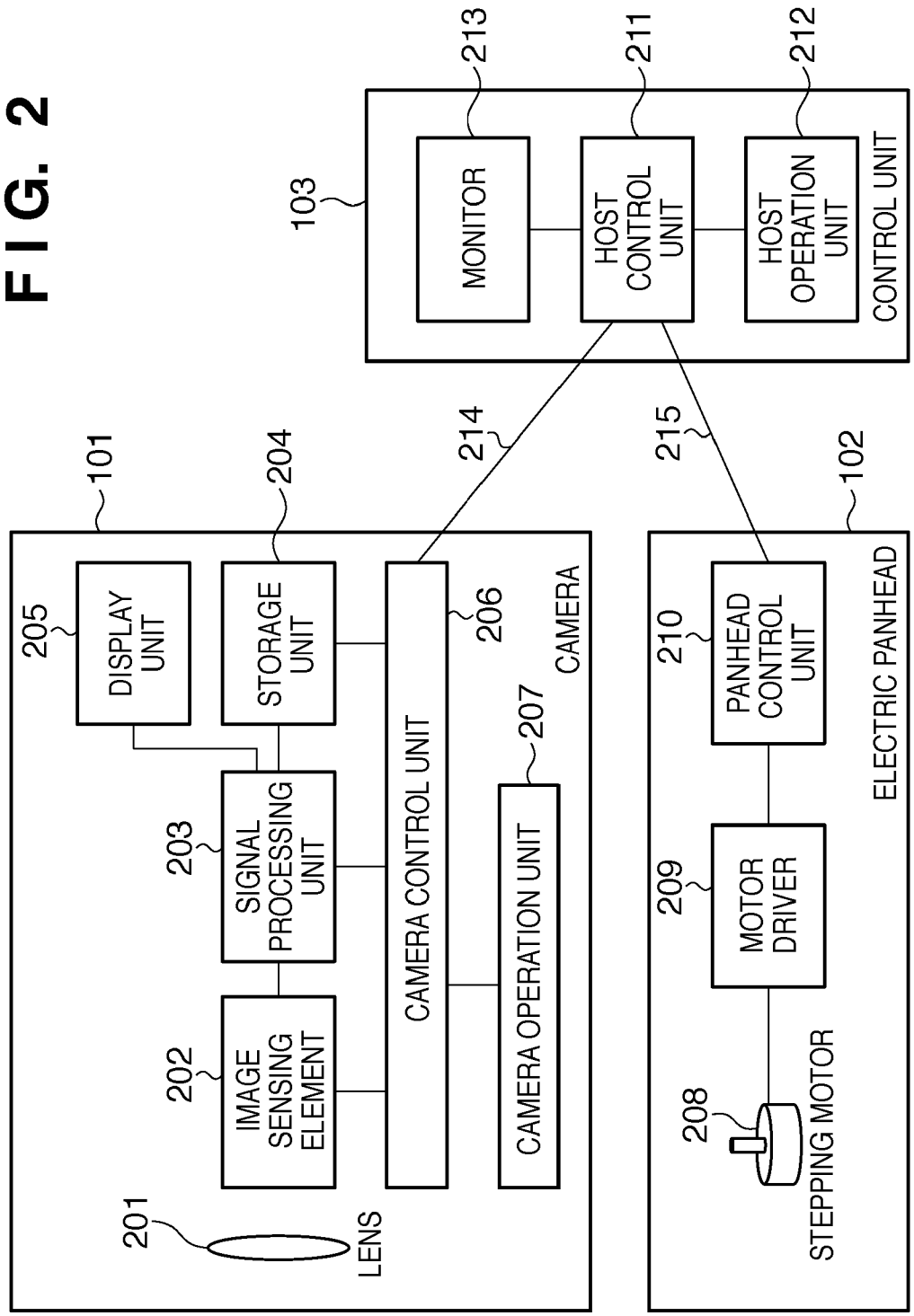
FIG. 2 is a block diagram showing the detailed configuration of the image capturing system according to the first embodiment.

FIG. 2 shows the detailed configuration of the image capturing system shown in FIG. 1. First, in the camera 101, reference numeral 201 denotes an lens of the image capturing optical system; and 202, an image-sensing element (for example, a CCD) which photoelectrically converts the formed optical image. Reference numeral 203 denotes a signal processing unit for performing a predetermined process of the sensed electrical signal; and 204, a storage unit for storing an image having undergone the signal processing. Reference numeral 205 denotes a display unit (for example, an LCD) for displaying the captured or stored image; 206, a camera control unit which controls the camera operation; and 207, a camera operation unit to which a user instruction is input. Next, in the electric panhead 102, reference numeral 208 denotes a stepping motor for rotationally controlling the electric panhead 102; 209, a motor driver; and 210, a panhead control unit which controls the rotational operation of the stepping motor 208. Lastly, in the control unit 103, reference numeral 211 denotes a host control unit (host computer). Reference numeral 212 denotes a host operation unit to which an image capture instruction to the camera 101 and a user instruction to designate the rotation angle of the electric panhead 102 are input; and 213, a monitor for displaying information in the host control unit 211. Reference numeral 214 denotes a communication line which connects the camera 101 and the control unit 103 to each other; and 215, a communication line which connects the electric panhead 102 and the control unit 103 to each other. The operations of these devices are controlled by sending control signals from the control unit 103 to the camera 101 and electric panhead 102 via the communication lines 214 and 215, respectively. Note that the communication lines 214 and 215 may be wired or wireless.

In the camera 101, an optical image formed on the image-sensing element 202 by the lens 201 undergoes signal processing by the signal processing unit 203, and is displayed on the display unit 205. When shutter operation is performed by the camera operation unit 207 or a shutter command is sent from the host control unit 211, the camera control unit 206 stores the currently captured image in the storage unit 204. Also, when a rotational operation command is sent from the host control unit 211, the panhead control unit 210 rotates in accordance with this command.

In this embodiment, the electric panhead 102 is controlled so that all captured images overlap adjacent captured images, and capture (divided capture) of the object is performed by a plurality of times. Note that in this embodiment, the camera 101 and the object 104 do not always straightly face each other even when the electric panhead 102 has zero pan and tilt angles (that is, in its home position).

Image Connection Process (Overview)

In this embodiment, a plurality of captured images obtained by a plurality of times of capture (divided capture) of an object are appropriately connected to each other to obtain a high-resolution image of the entire object. The object is larger than a view of the camera 101, and the images is obtained while changing the direction in which the camera 101 captures an image. An image connection process in this embodiment will be described below.

Figure 3:
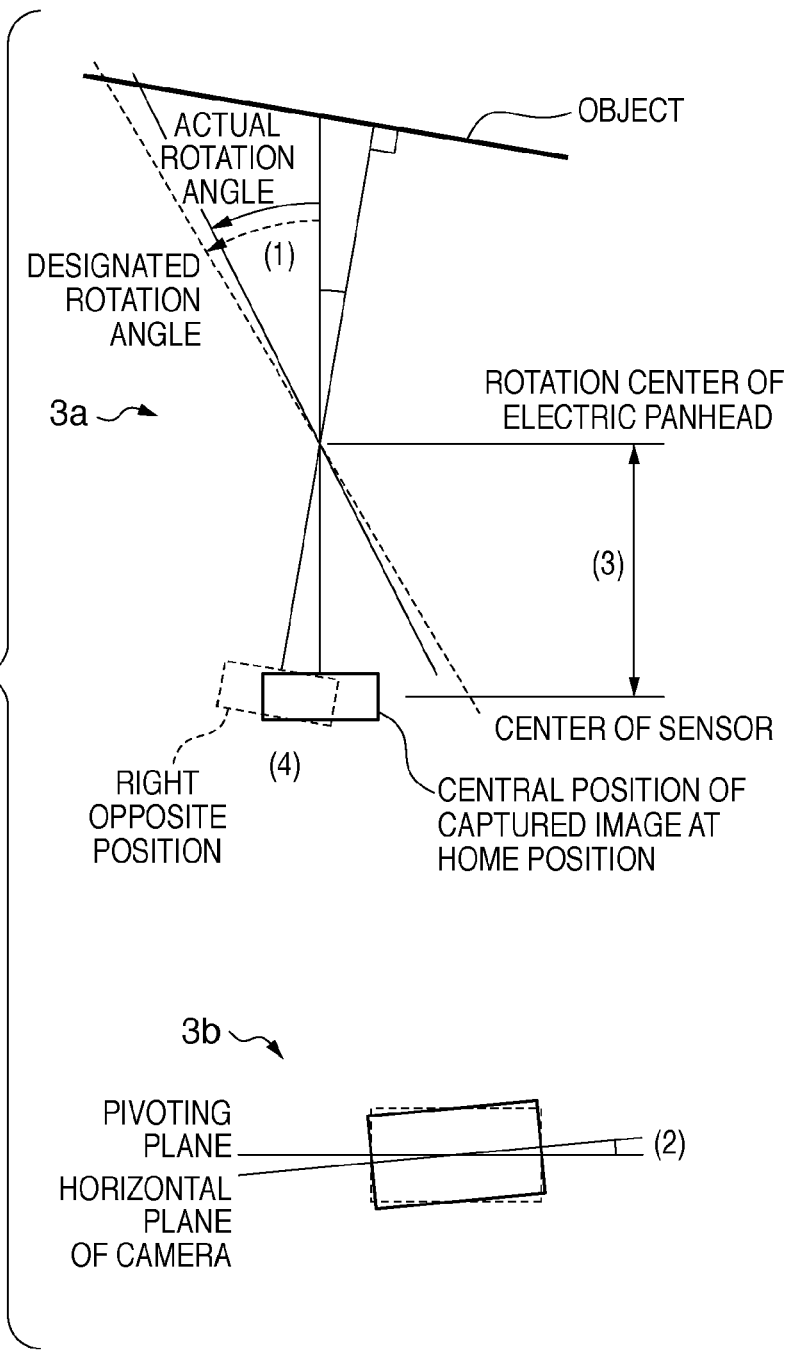
FIG. 3 is a showing errors that may occur in the image capturing system according to the first embodiment.

Errors (shifts) that often occur upon image capture in the image capturing system according to this embodiment will be described first with reference to 3a and 3b in FIG. 3. Four errors shown as (1) to (4) in FIG. 3 are mainly probable. (1) exemplifies a shift between a rotation angle designated for the electric panhead 102 and its actual rotation angle. The electric panhead 102 is driven via a gear. However, note that the camera cannot be precisely driven only by the designated angle due to, for example, a backlash. Nevertheless, the camera can be driven with a predetermined accuracy by setting, for example, an encoder on a motor built into the electric panhead 102. (2) exemplifies the tilt of the camera mounted on the electric panhead 102. Especially when the camera is fixed in position using a tripod seat for a lens, it may tilt with respect to the pivoting plane of the electric panhead 102 in the direction in which it rotates about the lens optical axis as a center. (3) exemplifies a shift between the center of an image sensor and the rotation center of the electric panhead 102. When a compact camera is fixed on the electric panhead 102, no large shift occurs between the position of a screw hole in the tripod for the compact camera and the central position of the image sensor. However, when a single-lens reflex camera is attached to the electric panhead 102 using, for example, a tripod seat, the central position of the image sensor may largely shift with respect to the rotation center of the electric panhead 102. (4) exemplifies a shift that occurs depending on whether the object and the camera at its home position straightly face each other.

In this embodiment, a satisfactory image connection result is obtained by estimating a correct camera position for each captured image obtained by divided capture, in consideration of various types of shifts as mentioned above.

Figure 4:
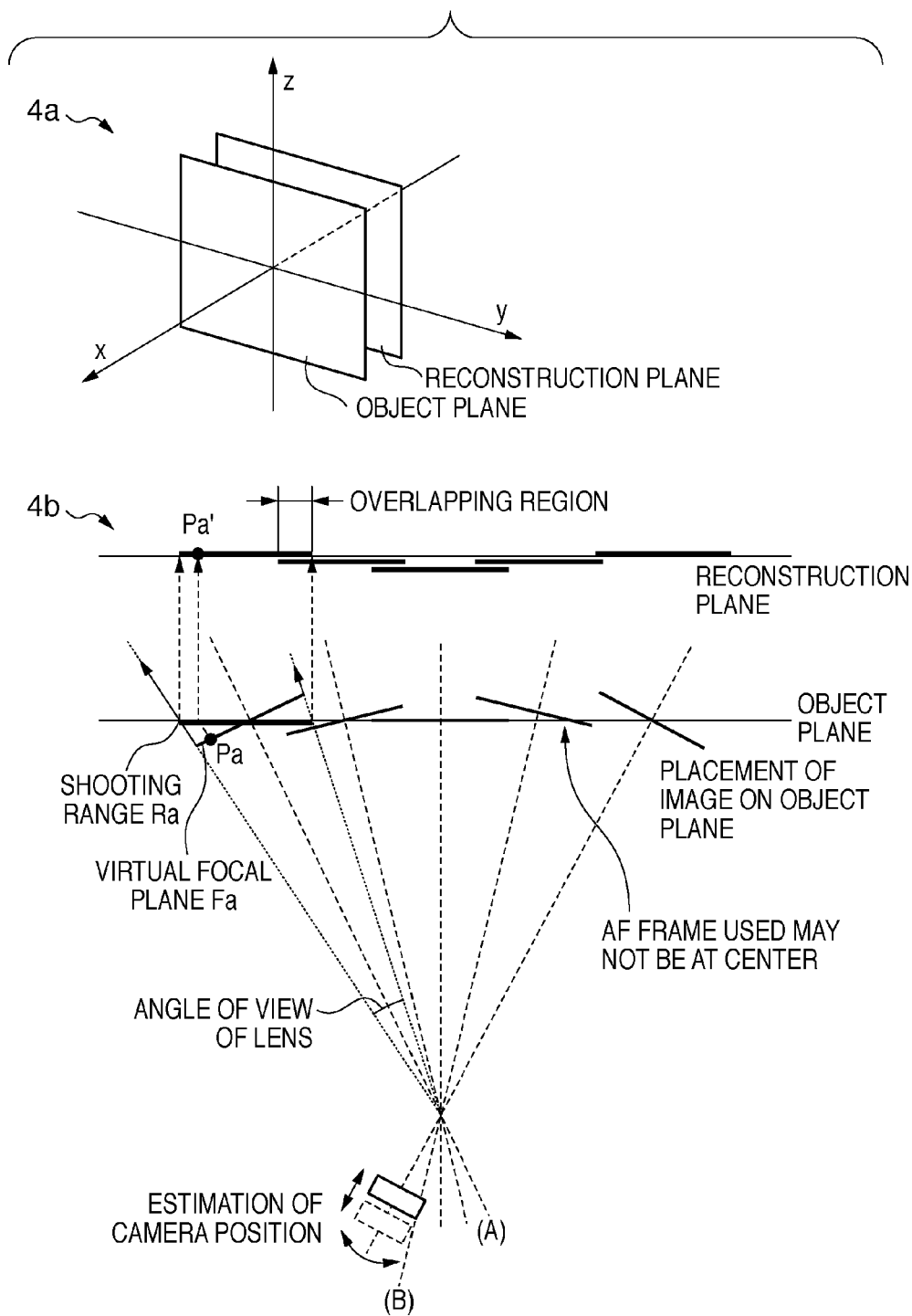
FIG. 4 is a view showing an overview of an image connection process in the first embodiment.

An overview of a connection process in this embodiment will be described first with reference to 4a and 4b in FIG. 4. In this embodiment, for the sake of descriptive simplicity, assume that the object can be approximated by a plane like a picture, and a plane which approximates the object will be referred to as an object plane. An object at a very large shooting distance, such as a landscape, can be treated approximately as a plane, so the method according to this embodiment can be directly employed. Also, when the object shape is known in advance, the method according to this embodiment can be employed upon forming an object plane conforming to this shape.

If the object is a plane, an object plane obtained by assuming the object on a given three-dimensional space (on a virtual space) is set, and captured images are mapped on the object plane, thereby placing the images, as shown in the diagram 4a. Referring to the diagram 4a, a reconstruction plane that is a virtual plane parallel to the object plane is assumed on the three-dimensional space. Details of this mechanism will be described later, but the amount of shift upon connection is calculated by projecting the captured images on the object plane onto the reconstruction plane (onto the virtual plane) in this embodiment. The object plane and the reconstruction plane need not always be parallel to each other.

The diagram 4b is a view showing the three-dimensional space, shown in diagram 4a, when viewed from the z-axis direction. Note that the angle that the captured image placed on the object plane makes with the object plane is determined depending on the camera position in image capture. The principle of the connection process in this embodiment will be described below with reference to diagram 4b. When the camera captures the object at a position indicated by, for example, (A) in diagram 4b so as to focus on the viewfinder center, a virtual focal plane Fa can be set based on the angle of view of the image capturing lens. The virtual focal plane Fa is a plane on which the camera focuses, and a region including the virtual focal plane Fa in a scene that appears when the object is seen from the camera position is recorded in the captured image. In this case, the camera at the position indicated by (A) does not straightly face the object plane, so a image within the shooting range Ra, on the object plane, is recorded in practice.

Hence, in this embodiment, a process of obtaining an object image which will be viewed from an eyepoint which is positioned at an infinite distance from the object and at which the line of sight direction straightly faces the reconstruction plane, that is, a so-called perspective correction process, is performed for one captured image obtained by divided capture, based on its image capturing direction using the reconstruction plane. A captured image which is on the reconstruction plane and has undergone perspective correction in this way will be referred to as a projected image hereinafter. In this embodiment, since a final connected image is obtained by arranging a plurality of projected images as mentioned above, the projected image will also be referred to as a connection image hereinafter.

If, for example, no distortion due to factors associated with the lens is present for the sake of descriptive simplicity, the pixel value at a point Pa' on the reconstruction plane becomes equal to that at a point Pa on the object plane in accordance with the distance between the object and the camera at the position indicated by (A) and the angle of view of the lens in image capture. Since the captured data is digital bitmap data, the pixel value is calculated by interpolating neighboring pixels if the point Pa has non-integer coordinates. When an AF frame used in the camera is not at the center of the captured image such as when the camera is at a position indicated by (B) in the diagram 4b, the virtual focal plane Fa is set such that the AF frame is placed on the object.

Figure 5:
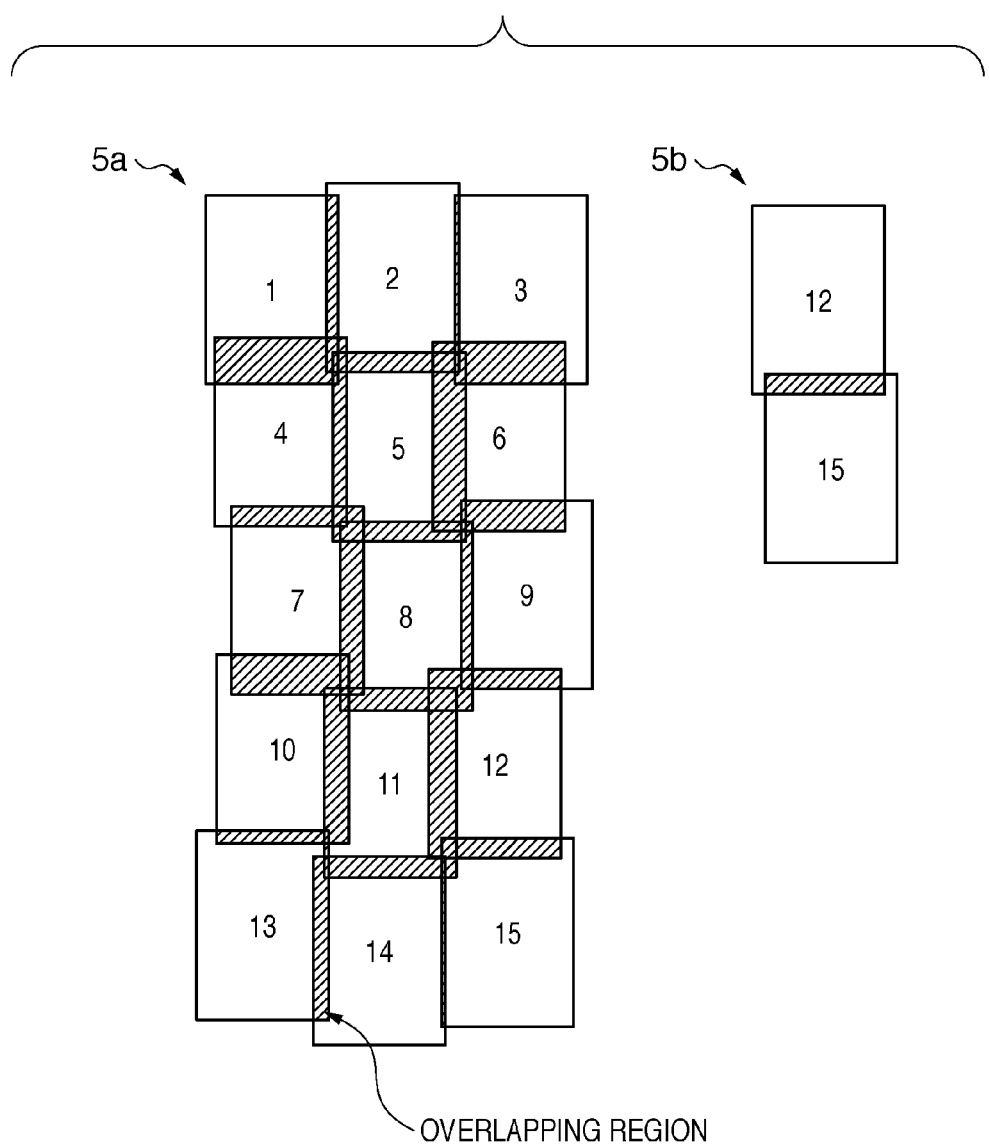
FIG. 5 is a view showing an example of projected images and regions in which they overlap each other in the first embodiment.

The diagram 5a in FIG. 5 shows an example of projected images 1 to 15 obtained in the foregoing way. Although the projected images have regions in which they overlap each other, a connected image in which the captured images have smooth boundary portions among them, that will not make a viewer to feel that some error exists, can be obtained by performing a predetermined blend process for these regions.

In this embodiment, captured images are projected onto the reconstruction plane, and a plurality of obtained projected images are connected to each other, as described above. However, installation errors of image capturing equipments as shown in FIG. 3 often occur in actual image capture. To cope with this situation, in this embodiment, an error in a region in which projected images overlap each other is evaluated, and image capturing equipment information (for example, the camera position) where this error minimizes is estimated. As shown in, for example, the diagram 5b of FIG. 5, the MSE (Mean Square Error) of the pixel values in a region in which adjacent projected images overlap each other is calculated, and the calculated value is determined as an error.

Figure 6:
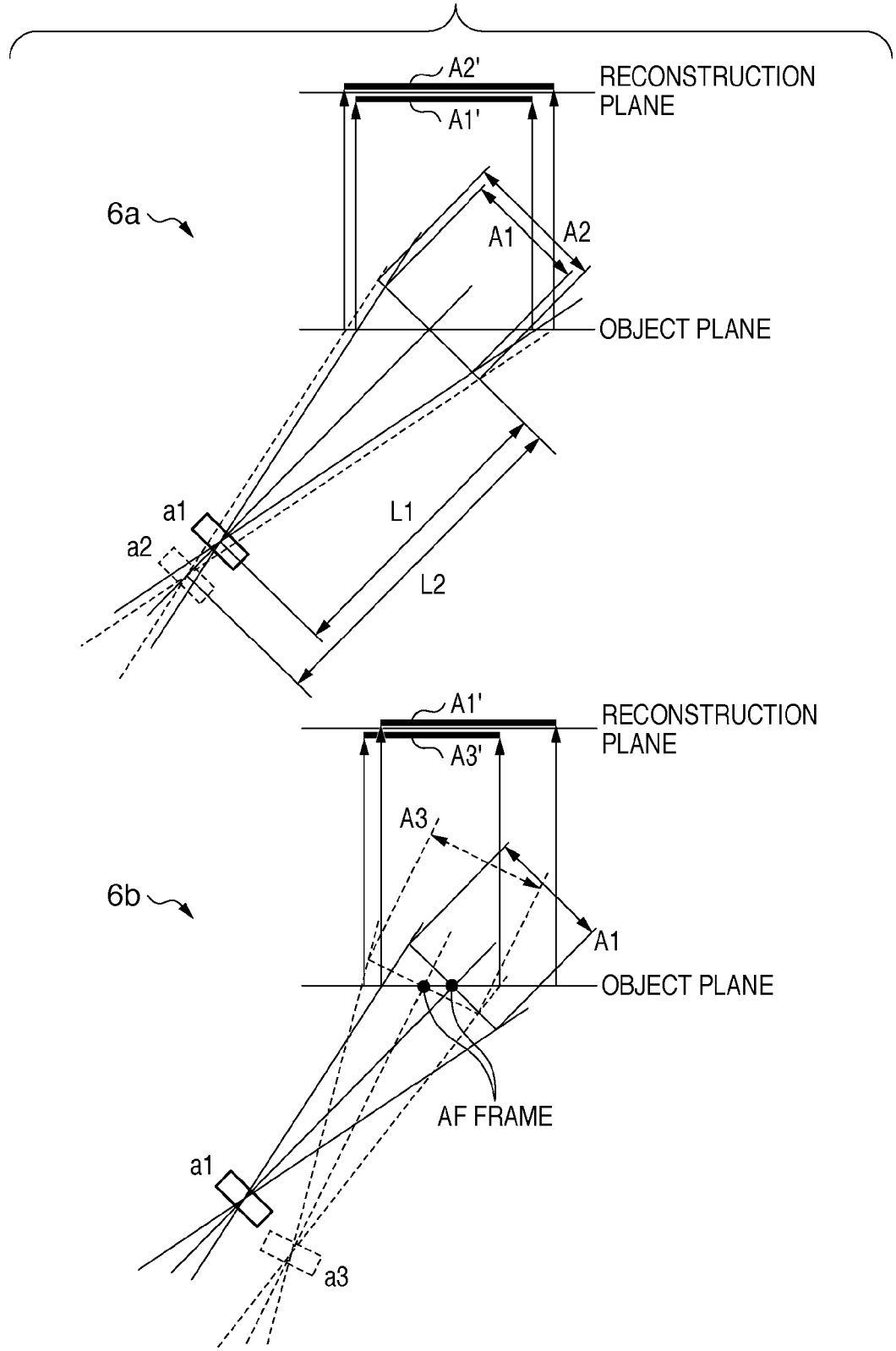
FIG. 6 is a view showing the difference in projected image due to a change in camera position in the first embodiment.

In this embodiment, to minimize the error in an overlapping region, the relative position between captured images placed on a three-dimensional space is not directly changed. Instead, a camera position at which the error minimizes is estimated. The diagrams 6a and 6b in FIG. 6 show a change in projected object region, that is, a change in projected image due to a change in camera position. For example, referring to the diagram 6a, reference symbols A1 and A2 denote virtual focal planes when the camera positions are a1 and a2, respectively. Image capturing regions on the object are projected as regions A1' and A2', respectively. A difference has occurred in image capturing region due to a change in camera position, as can be seen from the diagram 6a. The fact that a region in which projected images overlap each other has an error means that a region assumed as an image capturing region has an error. In this embodiment, this error is minimized by correcting the camera position, which may be a cause for the error. In practice, image distortions (for example, distortion aberration, magnification chromatic aberration, and vignetting) occur due to factors associated with the image capturing lens, and these characteristics change depending on shooting distances L1 and L2. Since the error cannot be correctly evaluated when such distortions are generated, a lens aberration correction process that uses correction parameters corresponding to the shooting distances is adopted in this embodiment. This lens aberration correction process will be described later.

The diagram 6a exemplifies a case in which the camera position changes due to a change in shooting distance. However, an actual camera position is not defined only by the shooting distance. Rather, this position is defined by a total of six parameters: position coordinates on a three-dimensional space and rotation directions (pitch, yaw, and roll) about respective axes. The diagram 6b exemplifies a change in position of the camera on the three-dimensional space. Reference symbols A1 and A3 denote virtual focal planes when the camera positions are a1 and a3, respectively. Image capturing regions on the object are projected as regions A1' and A3', respectively. The image capturing region largely changes due to a change in position of the camera on the three-dimensional space, as can be seen from the diagram 6b. Even in such a case, based on which AF frame is used in image capture, a point on the used AF frame is placed on the object plane, in this embodiment. In this way, the moving range of the virtual focal plane Fa is limited, and an optimal state can be searched for within a realistic processing time.

Image Connection Process (Details)

The detailed procedure of the above-mentioned image connection process will be described. Although the image connection process in this embodiment is controlled by executing a predetermined application on the host control unit 211 of the control unit 103, a hardware configuration which performs an equivalent process may be used.

Figure 8:
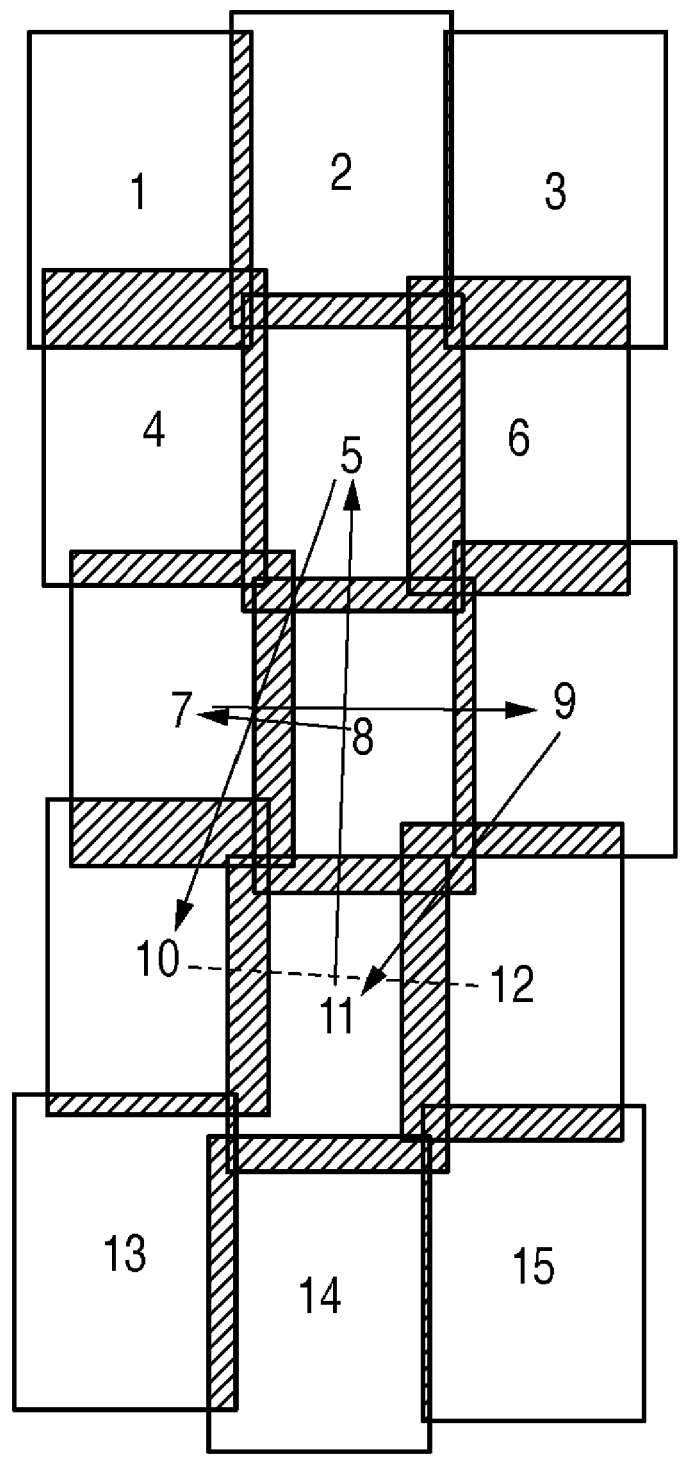
FIG. 8 is a view showing an example of the order of application of the image connection process to projected images in the first embodiment.

First, one reference image is determined from a plurality of captured images obtained by divided capture. The captured images are selected in descending order of proximity to the reference image, and a process of estimating the camera positions for the selected, captured images is performed. Several methods of determining a reference image are possible. In this embodiment, an image captured at the home position, for example, is determined as a reference image. In another method, the shooting distance of each image is obtained from image capturing equipment information, and an image captured at a minimum shooting distance is determined as a reference image. For example, FIG. 8 shows projected images similar to those shown in the diagram 5a. FIG. 8 shows an example in which when image 8 is a reference image among the images, the images are selected and processed in descending order of proximity of their centers to that of image 8. That is, image 7, image 9, image 11, image 5, image 10, image 12, . . . are sequentially selected with respect to reference image 8, and sequentially processed, thereby connecting all images to each other.

In this embodiment, the likelihood of the estimated camera position is evaluated based on the difference between adjacent images in a region in which they overlap each other. This evaluation uses only a region in which the image of interest overlaps the reference image or a captured image having already undergone camera position estimation process (that is, a projected image that has already been generated). When a camera position estimation process is applied to, for example, image 7, it is executed using only a region in which image 7 overlaps image 8. Also, a camera position estimation process is executed for image 5 using regions in which image 5 overlap images 7, 8, and 9. In this manner, the amount of calculation necessary for camera position estimation processes of the entire group of captured images can be reduced by determining the camera position for each captured image using a region in which the image of interest overlaps a captured image for which the camera position has already been determined.

Figure 7:
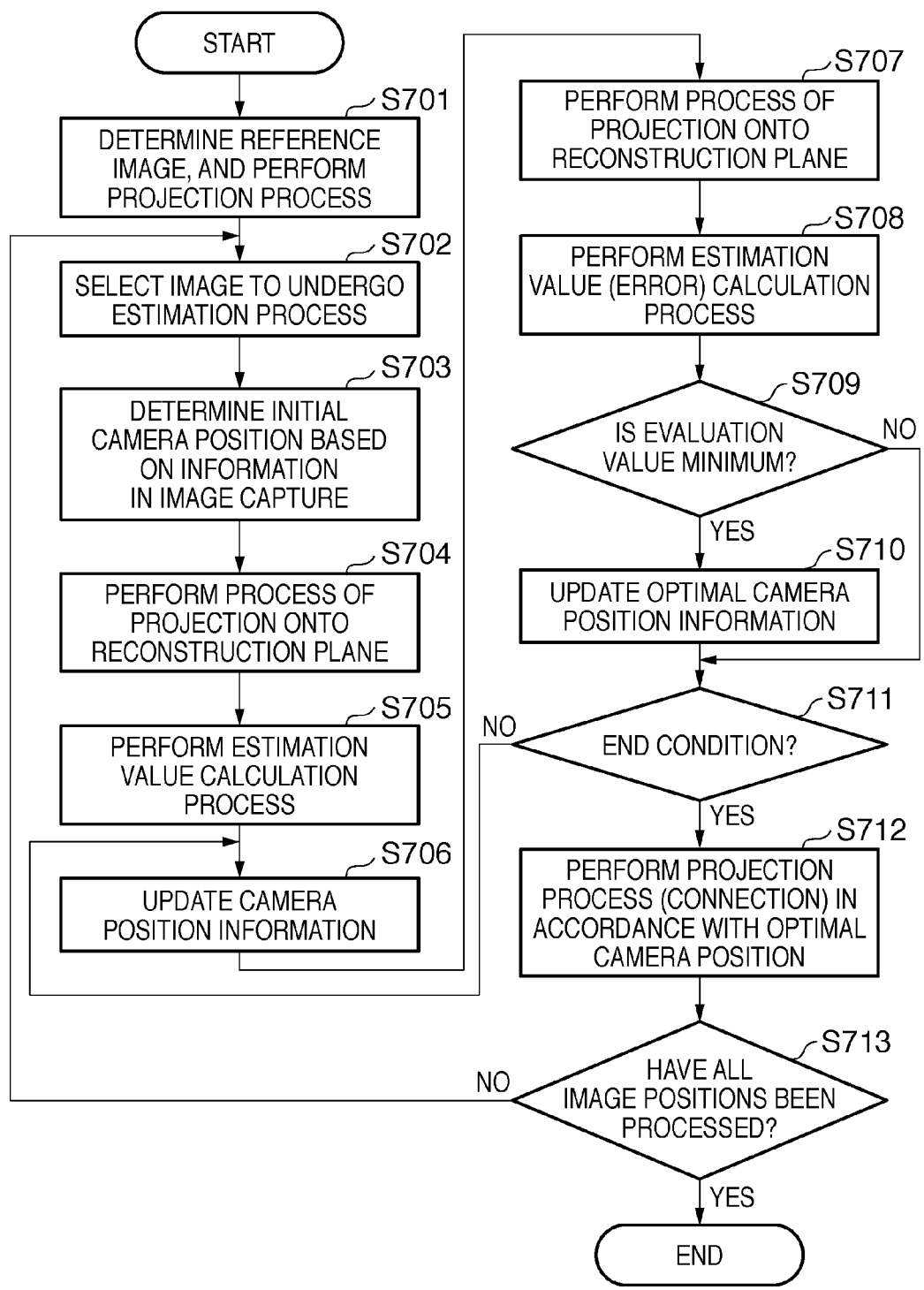
FIG. 7 is a flowchart showing the image connection process in the first embodiment.

Details of an image connection process in this embodiment will be described below with reference to a flowchart shown in FIG. 7. First, in step S701, a reference image is selected from captured images obtained by divided capture. At this time, a projection process is performed for the reference image. That is, the camera position in image capture is obtained from settings in image capture of the camera 101 for the reference image and control information of the electric panhead 102, a lens aberration correction process corresponding to the shooting distance of the camera 101 is applied, and perspective correction corresponding to the camera position is performed. Thus, the reference image is projected onto the above-mentioned reconstruction plane. The image position of the reference image on the reconstruction plane is determined by this projection process.

Next, in step S702, a captured image to which a camera position estimation process is applied is selected using the above-mentioned method and determined as a captured image of interest. In step S703, the initial state of the camera position for the captured image of interest is determined from settings in image capture of the camera 101 and control information of the electric panhead 102.

In step S704, the initial projection process corresponding to the initial state of the camera position, which is obtained in step S703, is performed. That is, a lens aberration correction process corresponding to the shooting distance obtained as the initial state of the camera position is applied to the captured image of interest, and perspective correction corresponding to the initial state of the camera position is performed for this image, thereby projecting this image onto the above-mentioned reconstruction plane.

Note that a known method is applicable to the lens aberration correction process in this embodiment, and a detailed description thereof will not be given herein. In this embodiment, a database of lens characteristics values and a lookup table for use in a lens aberration correction process are provided and used. That is, pieces of information on the shooting distance, the focal length, the f-number, and the type of lens are acquired from the database of lens characteristics values. Then, a lookup table for use in a lens aberration correction process is searched using these pieces of information, and the image is corrected based on the table obtained by the search. Note that the shooting distance changes in accordance with the camera position. Hence, if the shooting distance has changed, a lookup table for use in a lens aberration correction process must be searched again in order to obtain a correct correction result.

In step S705, an evaluation value for a region, in which the projected image generated as a result of the initial projection process in step S704 overlaps a projected image having already been generated, is calculated. This evaluation value shows the difference between two projected images overlapping in that region, that is, an error between them. Details of an evaluation value calculation process will be described later. Note that the evaluation value calculation process in this embodiment is performed for captured images other than a reference image, and an evaluation value calculated in step S705 becomes the initial value of the evaluation value for the captured image of interest.

In step S706, the camera position is updated within a predetermined range. In this embodiment, the state in actual image capture is used as a reference value, and parameter values which define the camera position are changed in ±100 steps, thereby searching for an optimal solution in a round-robin fashion. The camera position in image capture in this embodiment is defined by a position on a three-dimensional space and a pitch, yaw, and roll about respective axes, as described above. In this embodiment, that is, an optimal position is calculated while changing the state in steps of 1 mm (±10 cm) in a real space and in steps of 0.01° in rotation directions. Although an optimal position is searched for in a round-robin fashion in this embodiment, the number of round robins is not limited to the above-mentioned example, and may be determined in consideration of the trade-off between the processing speed and the processing accuracy. Also, a method of searching for an optimal solution is not limited to a round-robin method, and an optimal solution may be searched for at high speed using a genetic algorithm or a neural network, as a matter of course.

In step S707, a projection process corresponding to the camera position updated in step S706 is performed for the captured image of interest. The projection process at this time includes the second and subsequent projection processes with respect to the initial projection process in step S704 mentioned above. Again, a lens aberration correction process corresponding to the shooting distance, and perspective correction corresponding to the camera position, are performed for the captured image of interest, thereby projecting this image onto the reconstruction plane.

In step S708, an evaluation value is calculated, as in step S705, for an overlapping region of the projected image updated by the projection in step S707. In step S709, it is determined whether the evaluation value calculated in step S708 is a minimum of the evaluation values having already been calculated. Only if this evaluation value is a minimum, the camera position is set as optimal camera position information (optimal position information) for the captured image of interest in step S710.

If it is determined in step S711 that an estimation process end condition is not satisfied, the process returns to step S706, in which the camera position is corrected again, and an estimation process is executed again. Since an optimal solution is searched for in a round-robin fashion in this embodiment, the end condition in step S711 is whether execution of estimation processes for all combinations of parameter values which define the camera position has ended. In other cases, the end condition may be whether the calculated amount of error falls below a predetermined value.

If it is determined in step S711 that the estimation process end condition is satisfied, the process advances to step S712. At this moment, the camera position for the captured image of interest has already been optimized in step S710, so a projection process that uses this optimal camera position information is performed. That is, a lens aberration correction process and perspective correction corresponding to optimal camera position information are performed for the captured image of interest, thereby obtaining a projected image on the reconstruction plane. With this projection process, the image position of the captured image of interest on the reconstruction plane is decided, that is, the connection process ends. Connection of the images, whose positions are determined as above, can be performed by means of any of the conventional methods. At the end of the connection process, a predetermined blend process is performed for the overlapping region of the projected image, and the processed image is held in a memory (not shown) in the host control unit 211 as a connected, projected image. Alternatively, the projection process result obtained in step S707 may be held and used in the process in step S711.

Lastly, in step S713, it is determined whether connection processes for all captured images are complete, that is, decision of the image positions of all captured images on the reconstruction plane is complete. If all image positions have been decided, it is determined that connection processes for all captured images are complete, and the process ends. On the other hand, if a captured image for which the image position is to be decided remains, the process returns to step S702, in which position decision, that is, a connection process of the next captured image of interest continues.

Evaluation Value Calculation Method

Figure 9:
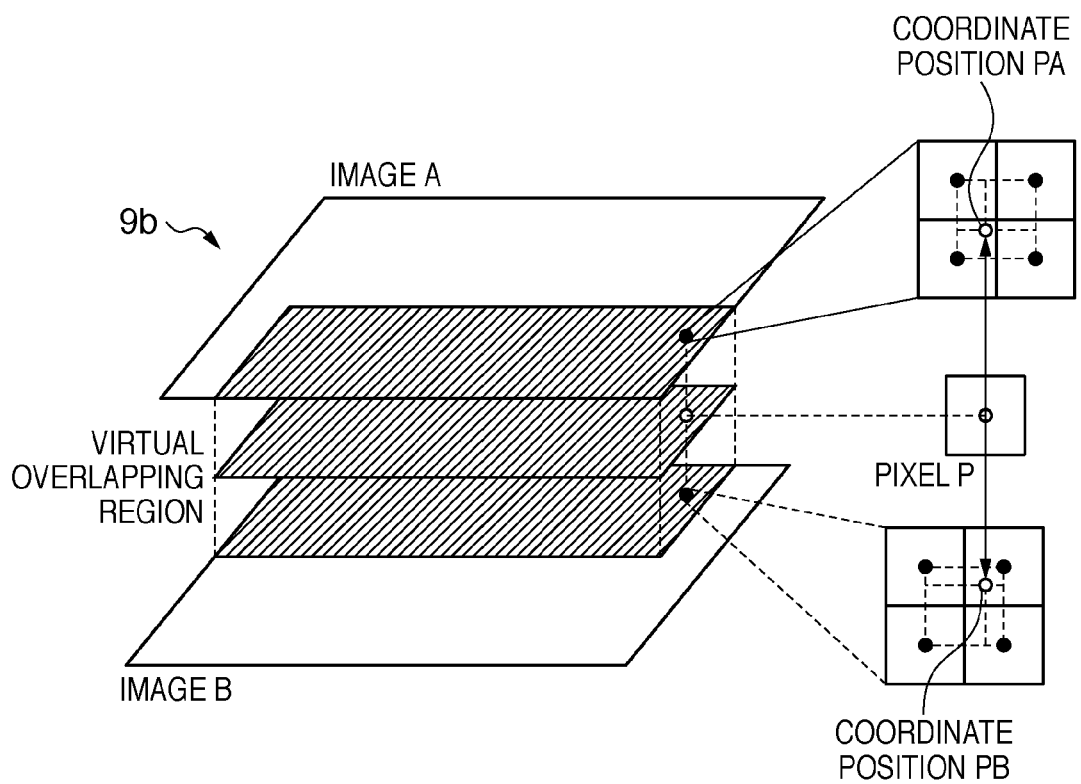
FIG. 9 is a view showing an overview of an evaluation value calculation method in the first embodiment.

A method of calculating an evaluation value in each of steps S705 and S708 mentioned above will be described in detail herein with reference to the diagrams 9a and 9b in FIG. 9. For example, assume that two projected images A and B are placed, as shown in the diagram 9a. Because images A and B are projected onto a reconstruction plane under the influence of the perspective of the object and a minute shift in camera position, they are likely to have different pixel center positions. In addition to this, projected images A and B may have different pixel sizes (distances between the centers of adjacent pixels). To cope with this situation, in this embodiment, a virtual overlapping region is set between images A and B, as shown in the diagram 9b. Images A and B are projected onto the same reconstruction plane, so a space as shown in the diagram 9b is not present in practice. However, pixels with a minute shift between them can be compared upon setting a virtual overlapping region between images A and B. Although the resolution of the virtual overlapping region can be arbitrarily set, it is set to a resolution corresponding to the average of the pixel sizes (the distances between the centers of adjacent pixels) of images A and B in this embodiment.

Referring to the diagram 9b, reference symbol PA denotes the coordinate position on image A; and PB, the coordinate position on image B, both corresponding to that of a pixel P on the virtual overlapping region. Since the coordinate positions PA and PB are spaced apart from the center of the pixel P on each image, the pixel value of the pixel P is calculated by interpolating neighboring pixels. More specifically, as shown in FIG. 9, the pixel value is determined by bilinear interpolation using four neighboring pixels, but an interpolation process such as bicubic interpolation may be performed using a larger number of reference pixels instead. The amount of error of the pixel P on the virtual overlapping region can be determined by calculating the difference between the pixel values at the coordinate positions PA and PB, which are calculated in this way. In this embodiment, after calculation of the amount of error as described above is performed for all pixels which form the virtual overlapping region, their mean square error (MSE) is obtained and determined as an evaluation value.

As has been described above, according to this embodiment, the camera position is correctly estimated by searching for the state, in which the evaluation value minimizes, while gradually changing the camera position. An appropriate image connection process can be performed by lens aberration correction, placement on a three-dimensional space, and projection onto a reconstruction plane, which are based on the camera position.

<Second Embodiment>

The second embodiment according to the present invention will be described below. The first embodiment has given an example in which captured images obtained by divided capture are connected to each other by setting a reference image from the captured images, and executing camera position estimation processes for the captured images in descending order of proximity to the reference image. This method requires a relatively small amount of calculation per camera position estimation process, and therefore has an advantage that only a short total processing time is necessary. However, as the camera position is decided for each captured image as in the first embodiment, it may result in a local minimum (local solution). For example, a captured image farthest from the reference image may not be able to be appropriately connected no matter how the camera position is set, as a result of error accumulation. To cope with this situation, in the second embodiment, an overall evaluation value associated with all overlapping regions of all captured images is calculated. The camera position for each captured image is estimated by optimizing it so that the overall evaluation value minimizes. This makes it possible to obtain an optimal solution under designated search conditions.

Details of an image connection process in the second embodiment will be described below with reference to a flowchart shown in FIG. 10. In the second embodiment, as well as the above-mentioned first embodiment, a camera position estimation process is executed using equipment settings in image capture as the initial state first. That is, in step S1001, all captured images are projected onto a reconstruction plane based on respective equipment settings in image capture. In step S1002, an evaluation value for each overlapping region is calculated using the same method as in the first embodiment, and the average of evaluation values for all captured images is calculated. In the second embodiment, the average of evaluation values for each overlapping region is determined as an overall evaluation value for the entire group of captured images. The connection process according to the second embodiment is characterized in that the camera position for each captured image is optimized so that the overall evaluation value minimizes, thereby connecting the captured images to each other.

Subsequently, in steps S1003 to S1005, the camera position for each of a plurality of captured images is updated in accordance with a predetermined method, and these images are projected onto the reconstruction plane in accordance with the updated camera position, thereby calculating an evaluation value for each captured image, as in the first embodiment. Thus, in contrast to the first embodiment in which an evaluation value for a captured image of interest is calculated for a region in which this image overlaps an adjacent projected image for which the image position has already been decided, evaluation values are calculated for overlapping regions in all directions in the second embodiment.

The camera position can be updated in step S1003 using, for example, a method of changing, in ±100 steps, parameter values which define the camera position for each captured image, as in the first embodiment. In this case, evaluation values for all captured images are calculated in each step for each captured image. It is also possible to designate camera position search conditions in advance. That is, instead of updating all parameter values for all captured images in a round-robin fashion, parameter values to be updated are determined as search conditions in advance. In this case, evaluation values for all captured images are calculated for only a parameter value designated as a search condition.

In step S1006, an overall evaluation value is calculated by calculating the average of the calculated evaluation values for respective captured images. In step S1007, it is determined whether the overall evaluation value is a minimum up to the current process. If the overall evaluation value is a minimum, in step S1008 the optimal camera position for each captured image is updated, and the process advances to step S1009.

In step S1009, it is determined whether to end the camera position estimation process. In the second embodiment, it is determined whether to end the estimation process using the fact that the overall evaluation value is smaller than a predetermined value as an end condition. If the end condition is not satisfied, the process returns to step S1003, in which the estimation process continues. If the end condition is satisfied, in step S1010 each captured image is projected onto the reconstruction plane in accordance with its optimal camera position to obtain a connection result, and the process ends.

As has been described above, according to the second embodiment, an optimal image connection result can be obtained while preventing the camera position from resulting in a local minimum, by means of setting an overall evaluation value for all captured images obtained by divided capture, and performing a camera estimation process.

<Third Embodiment>

The third embodiment according to the present invention will be described below. The above-described second embodiment is concerned with a method of obtaining a satisfactory connection result irrespective of the image capturing position by evaluating an error for the entire group of captured images obtained by divided capture. However, the process shown in the second embodiment requires a very considerable amount of calculation, and may not end within a realistic time period.

Taking into consideration installation errors of image capturing equipments as shown in FIG. 3, a camera tilt error shown in, for example, (2) may be the same among all captured images. Also, a shift between the rotation center of the electric panhead and the center of the sensor, which is shown in (3), may be less likely to change during divided capture of the same object. On the other hand, errors such as a shift in rotation angle shown in (1) and the shooting distance for each captured image are likely to differ for each image obtained by image capture.

To cope with this situation, in the third embodiment, errors are divided into global errors common to the entire group of captured images, and local errors which differ for each captured image. More specifically, a first parameter related to a global error is estimated by selecting some overlapping regions, this error is corrected for all images, and thereafter a second parameter related to a local error is estimated, and a correction process is performed for each image. With such a process, the number of combinations of different errors is decreased, thereby making it possible to reduce the amount of calculation. For example, assume that four estimation parameters are set for a certain overlapping region, about 1.6 billion evaluation value calculation processes are necessary to obtain an optimal solution in a round-robin fashion. However, when only one of these parameters is separately calculated as a global error, only 8 million evaluation value calculation processes need to be executed for a process of estimating the remaining three parameters. This makes it possible to greatly reduce the amount of calculation.

Image Connection Process

Figure 11:
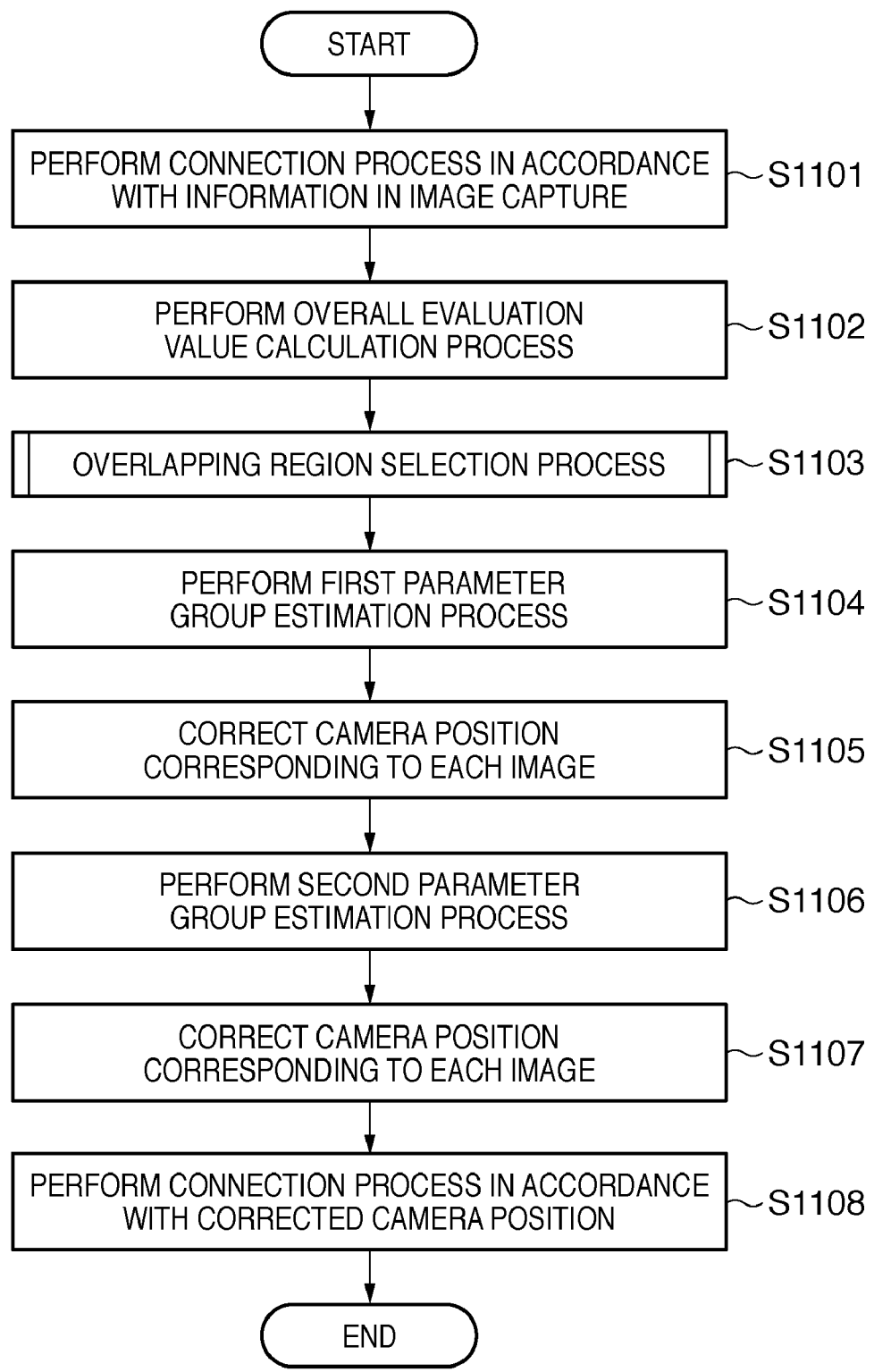
FIG. 11 is a flowchart showing an image connection process in the third embodiment.

An image connection process in the third embodiment will be described in detail below with reference to a flowchart shown in FIG. 11. In the third embodiment, the camera tilt ((2) in FIG. 3) is corrected as a first parameter related to a global error. After that, the remaining parameters are corrected as second parameters related to local errors.

Figure 10:
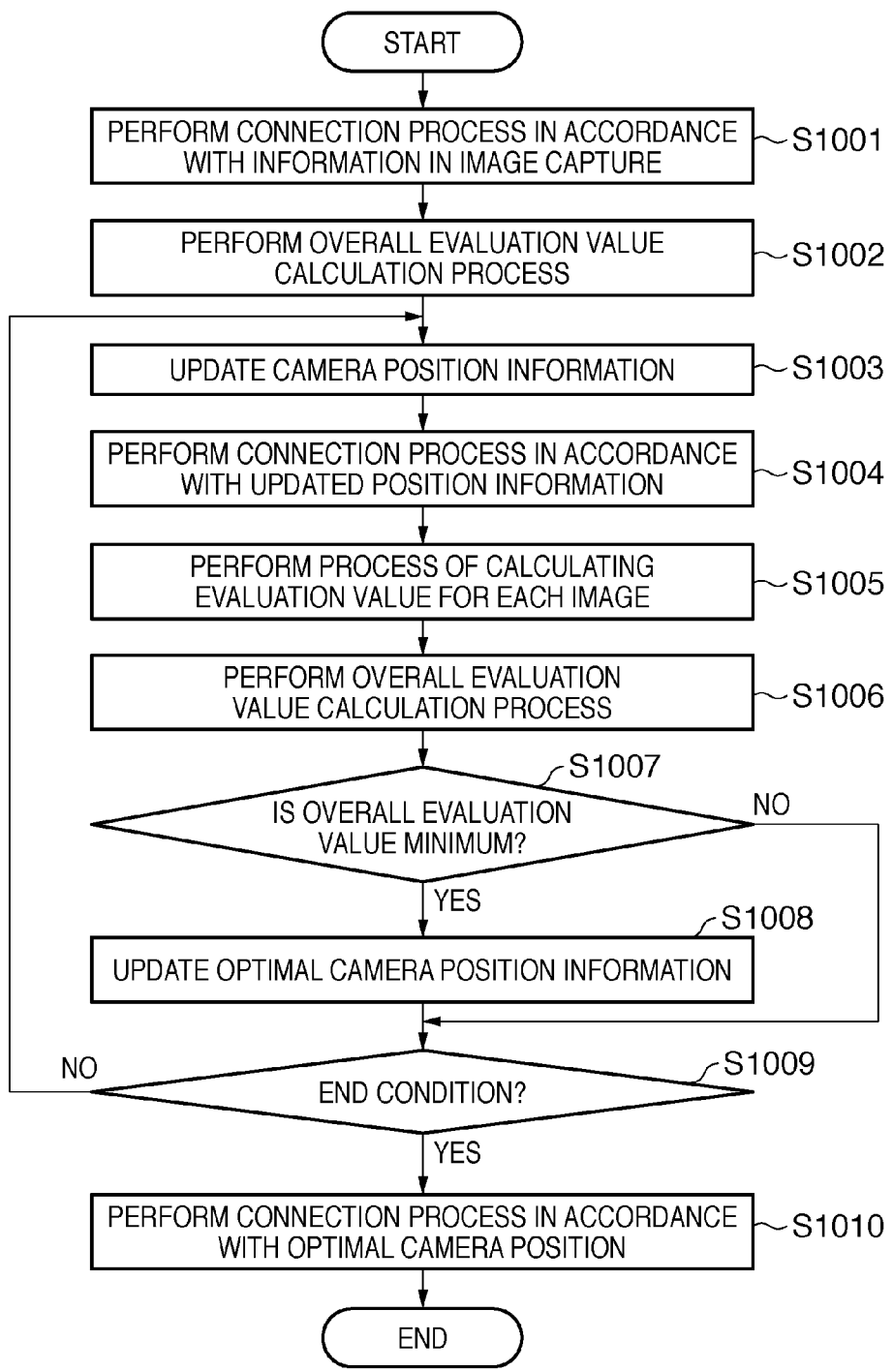
FIG. 10 is a flowchart showing an image connection process in the second embodiment.

First, in steps S1101 and S1102, as well as steps S1001 and S1002, respectively, in FIG. 10 of the above-described second embodiment, all captured images are projected and an overall evaluation value is calculated, both based on the initial state of the camera position corresponding to equipment information in image capture.

Next, in step S1103, a maximum of n characteristic regions are selected from overlapping regions obtained by projection based on the initial state. Details of the overlapping region selection process will be described later.

In step S1104, a first parameter with which an error in each of the overlapping regions selected in step S1103 minimizes is estimated (first estimation process). In step S1105, the camera position for each captured image is corrected using the estimated first parameter. In the third embodiment, the camera tilt is set as the first parameter, and the tilt in camera installation in an image capturing system is corrected in this stage.

In step S1106, second parameters corresponding to the remaining errors are estimated (second estimation process), and in step S1107 the estimated second parameters are reflected on the camera position for each captured image. In step S1108, each captured image is projected onto a reconstruction plane in accordance with its camera position to obtain a connected image.

Overlapping Region Selection Process

The first parameter in the third embodiment is estimated by selecting and using some overlapping regions, instead of using overlapping regions for all captured images. Because the first parameter influences the camera positions for all captured images, regions that are as characteristic as possible will be suitable to be selected in order to obtain a correct estimation result. The use of a region with a higher edge intensity, for example, allows correct error estimation, whereas the use of an object having a repetitive pattern such as a mounting of a hanging scroll leads to erroneous determination. Hence, in the third embodiment, an overlapping region which satisfies conditions:

1) the edge intensity is high, 2) the number of edges detected within one overlapping region is small, and 3) the region is equal to or larger than a predetermined area can be selected.

Figure 12:
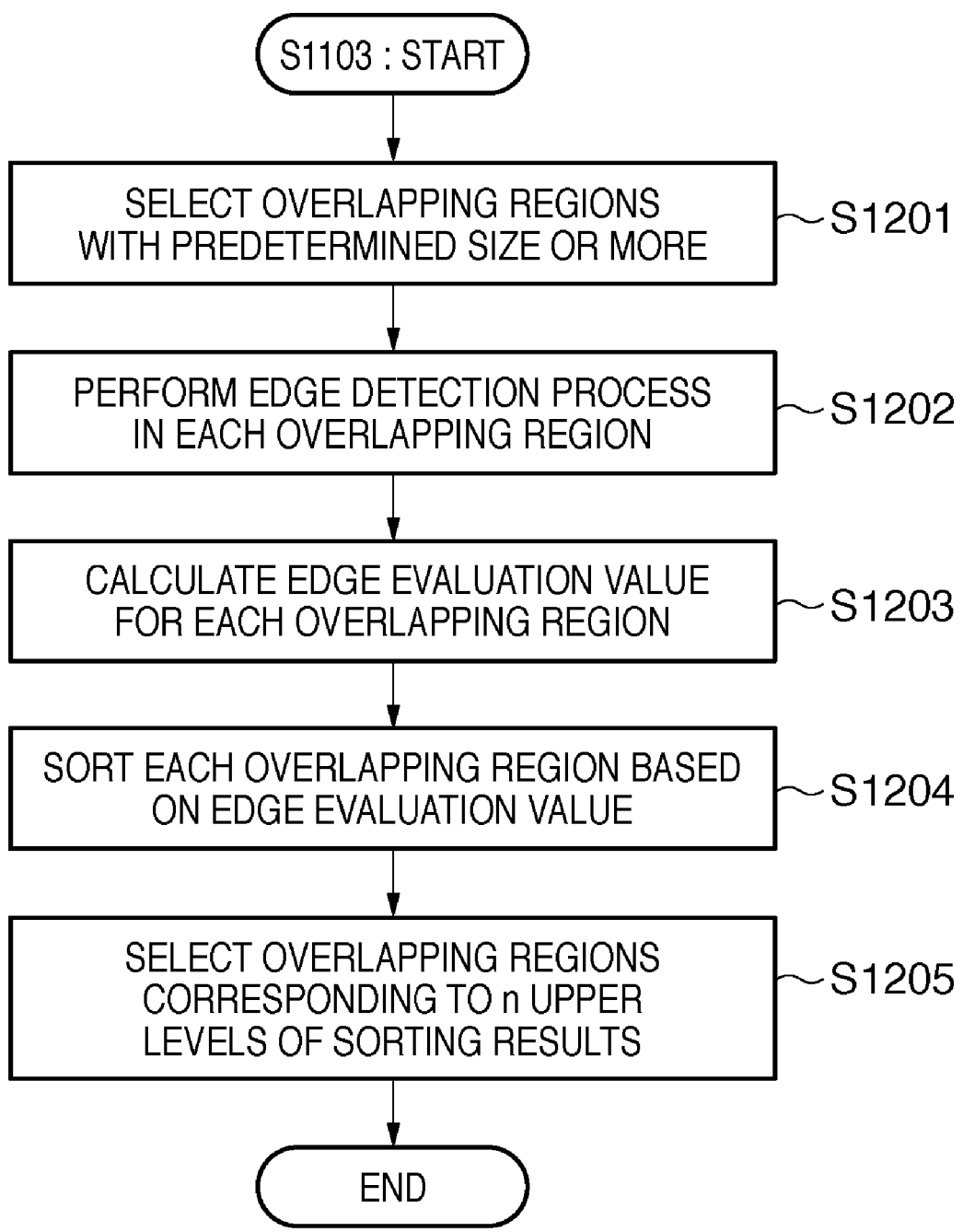
FIG. 12 is a flowchart showing an overlapping region selection process in the third embodiment.

The overlapping region selection process in step S1103 mentioned above will be described herein with reference to a flowchart shown in FIG. 12. First, in step S1201, only regions with a predetermined size or more are extracted from overlapping regions. An example in which overlapping regions with both widths and heights of 50 pixels or more are selected will be given herein. However, the size of an overlapping region may be evaluated not only based on the width and height but also based on, for example, the number of pixels, as a matter of course. Note that if none of overlapping regions is selected, this process may be repeatedly tried by changing the condition until a image is selected, or may be switched to a normal process (for example, in the above-described first or second embodiment).

Next, in step S1202, an edge detection process is applied to each overlapping region selected in step S1201. The edge detection can be performed on a combined image of the images projected in step S1101. Alternatively, the edge detection can be performed on one or more of the uncombined projected images. In step S1203, an edge evaluation value Ei for each overlapping region is calculated based on the edge detection results of these regions. The edge evaluation value Ei is calculated as a function of the edge intensity V and the number of detected edges N as:

$$Ei = f(V, N) \quad (1)$$

In the third embodiment, the edge evaluation value Ei is defined as:

$$Ei = V/N \quad (2)$$

Edge detection in the third embodiment uses a Sobel filter. In this case, first, the edge intensity of each pixel, which is obtained by applying the filter, is sorted, and the average of upper 10% edge intensity values is determined as the edge intensity V. The number of detected edges N can be obtained using, for example, a method of obtaining the number of straight lines within a target region by applying Hough transformation. However, since a process of calculating the number of edges has a relatively high load, the ratio of edge pixels may be alternatively calculated for the sake of simplicity. In the third embodiment, the number of detected edges N is defined as, for example, the ratio of edge pixels in an overlapping region. Note that whether the pixel of interest is an edge pixel or not is determined by processing a threshold for a predetermined edge intensity.

In step S1204, each overlapping region is sorted by the edge evaluation value calculated in step S1203. In step S1205, overlapping regions corresponding to n upper levels of the sorting results, for example, five overlapping regions with high evaluation values are selected. Thus, overlapping regions which satisfy the above-mentioned conditions 1) to 3) can be selected. In the third embodiment, a process of estimating a first parameter is executed upon setting n=5, that is, by using overlapping regions corresponding to upper five levels.

As has been described above, according to the third embodiment, parameters to be estimated are classified into two groups and processed, thereby making it possible to estimate the camera position at high speed and execute an image connection process.

<Fourth Embodiment>

The fourth embodiment according to the present invention will be described below. The fourth embodiment is characterized in that whether to apply either of the schemes described in the first to third embodiments is determined in accordance with the number of images obtained by divided capture. If, for example, the number of images obtained by divided capture is n or less both in the horizontal direction and in the vertical direction, image connection that uses the method of the first embodiment can be performed; otherwise, image connection that uses the method of the second or third embodiment can be performed. Note that n can be, for example, 3.

Figure 13:
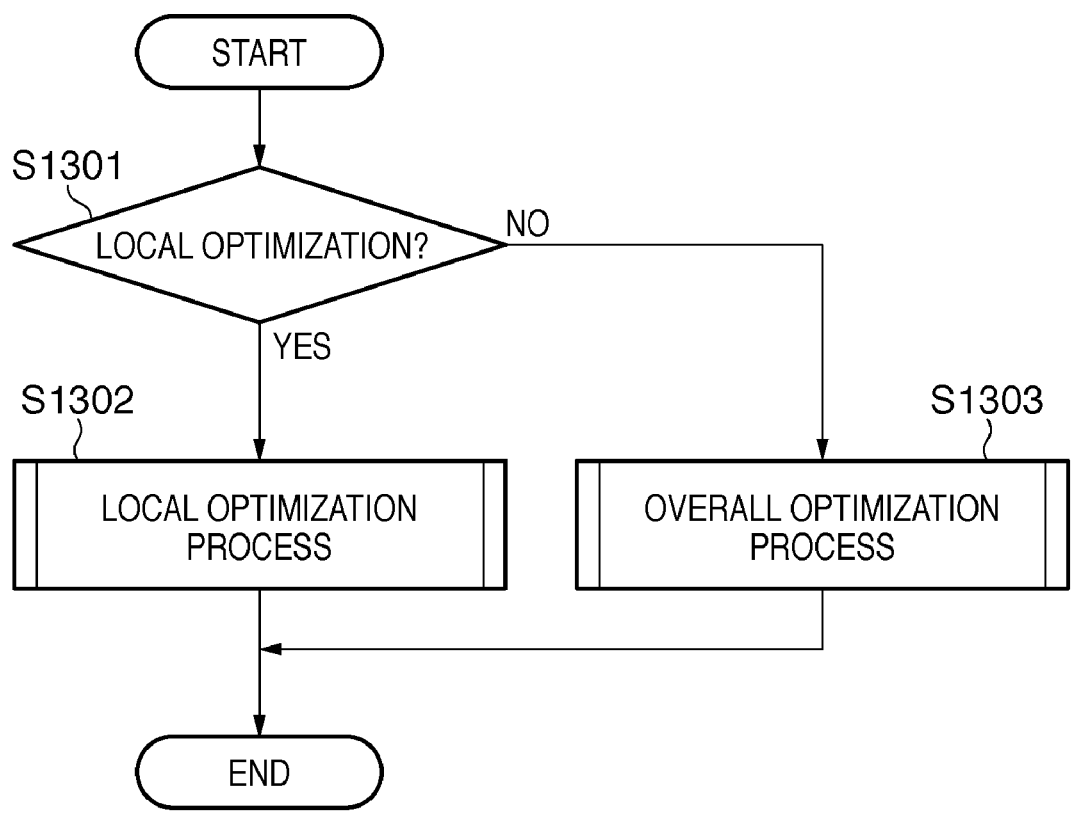
FIG. 13 is a flowchart showing an image connection process in the fourth embodiment.

An image connection process in the fourth embodiment will be described with reference to a flowchart shown in FIG. 13. A process of setting a reference image first, and estimating the camera position from a captured image closer to it, as in the above-described first embodiment, will be referred to as a local optimization process hereinafter. Also, a process of estimating the camera position so as to be optimum for all captured images to be connected, as in the second embodiment, will be referred to as an overall optimization process hereinafter.

First, in step S1301, it is determined based on the state of divided capture whether to apply a local optimization process or an overall optimization process. As described above, in the fourth embodiment, this determination is done based on the numbers of images obtained by divided capture in the horizontal and vertical directions. Only if, for example, the number of images obtained by divided capture is equal to or less than three in both the horizontal and vertical directions, the process advances to step S1302, in which a local optimization process is executed; otherwise, the process advances to step S1303, in which an overall optimization process is executed.

As has been described above, according to the fourth embodiment, a satisfactory connected image can be obtained within a shorter period of time by changing the method of estimating the camera position in accordance with the number of images obtained by divided capture.

<Fifth Embodiment>

The fifth embodiment according to the present invention will be described. Each of the above-described embodiments has given an example in which an error in an overlapping region is evaluated without taking into consideration deterioration in image quality upon lens aberration correction. Examples of deterioration in image quality upon lens aberration correction generally include a decrease in resolution due to local enlargement interpolation upon distortion correction, and an increase in amount of noise upon vignetting correction. Note especially that vignetting correction is a process of increasing the gain of an image peripheral portion and therefore enhances noise components at the same time, and this may make it impossible to correctly perform edge detection and error evaluation. Similarly, even if a perspective correction process is applied, an interpolation process is applied for each pixel, so the image quality may deteriorate resulting from a change in resolution.

To deal with such deterioration in image quality, an error evaluation function reflecting the amount of deterioration in image quality upon a lens aberration correction process is used in the fifth embodiment. An error in an overlapping region between projected images (between connection images) can be correctly evaluated by lowering the degree of reliability of a pixel which is largely corrected using the evaluation function. More specifically, an evaluation value is calculated using an evaluation function which takes into consideration the amount of lens aberration correction as a variable instead of using a simple MSE.

Figure 14:
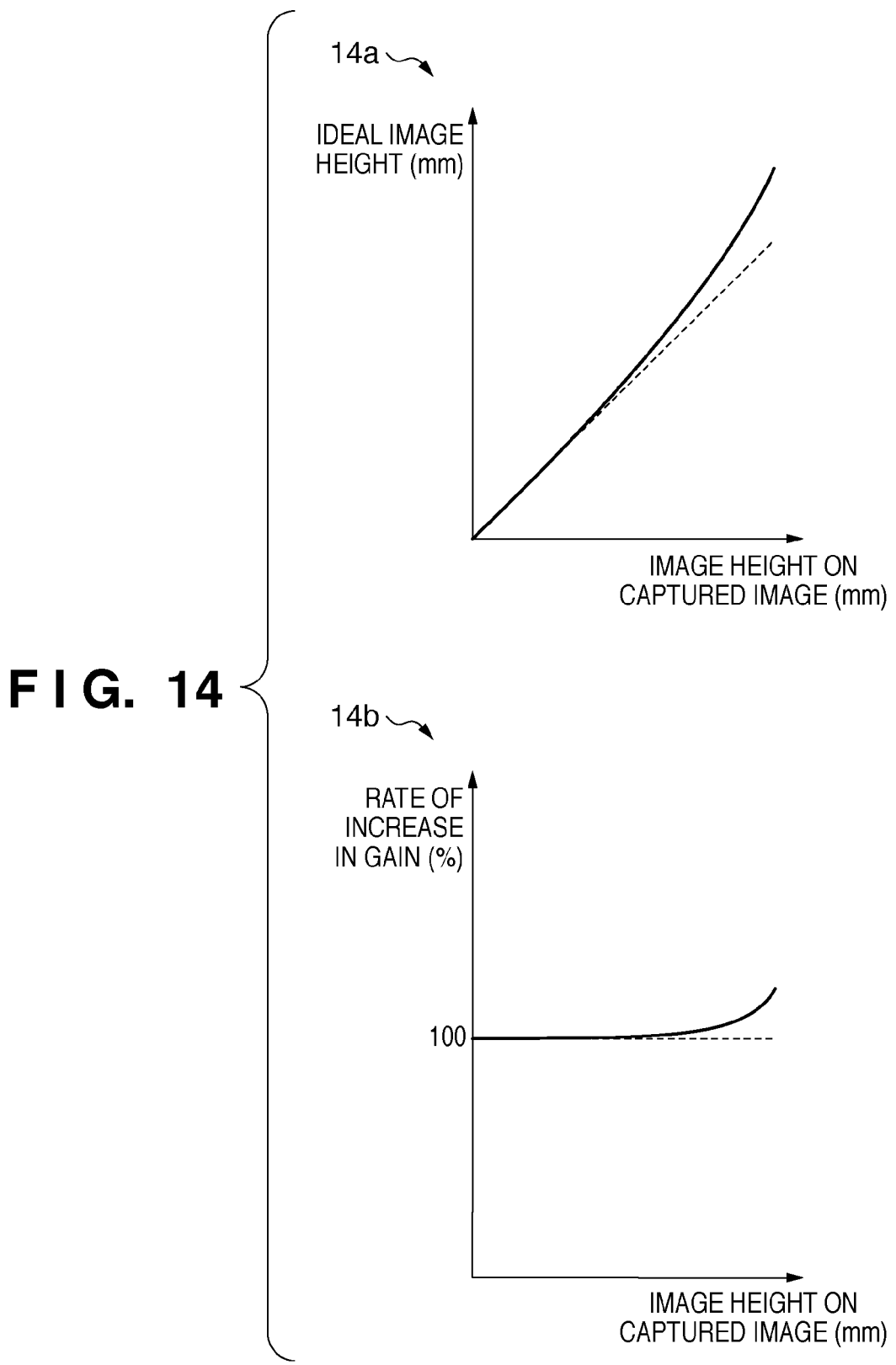
FIG. 14 is a view showing exemplary graphs of lens characteristics values in the fifth embodiment.

The diagrams 14a and 14b in FIG. 14 show an example of lens characteristics values. The diagram 14a shows the distortion characteristic that is the difference between an ideal image height and the image height on the captured image. A broken line in the diagram 14a shows a case in which the image height coincides with the ideal image height. If the ideal image height is higher than the image height on the captured image, a pixel at this image height is locally enlarged by interpolation. Hence, the larger the difference between the ideal image height and the image height on the captured image, the lower the resolution. Conversely, if the ideal image height is lower than the image height on the captured image, a pixel at this image height is locally reduced, so the resolution increases.

Also, The diagram 14b shows the vignetting characteristic, that is the amount of gain in relation to an image height of a pixel on the captured image. A broken line in the diagram 14b shows a case in which the gain of the pixel value is not increased upon vignetting correction. As the pixel value increases in proportion to the amount of gain, the amount of noise also increases with an increase in gain.

A lens aberration correction process is generally performed based on the lens characteristics values shown in FIG. 14, in further consideration of an amount of correction. An amount of correction is 100 when, for example, a value corresponding to a lens characteristics value is directly corrected. When the amount of correction is 50, distortion correction, in which the intermediate image height between the ideal image height and the image height on the captured image is set as a target value, for example, is applied. Thus, taking into consideration the amount of correction of the aberration, an evaluation function in the fifth embodiment is given as an evaluation value Ek in an overlapping region k:

$$Ek=1/M\times\Sigma\{(P(i,j)-S(i,j))\times(P(i,j)-S(i,j)/L(i,j))\} \quad (3)$$

where i and j are the coordinates corresponding to a pixel which forms an overlapping region, and M is the number of pixels in the overlapping region. Also, P(i,j) is the value of a pixel in the overlapping region, and S(i,j) is the average of the values of pixels in the overlapping region. Moreover, L(i,j) is a lens aberration correction coefficient given by:

$$L(i,j)=\alpha\times(1+Da/100\times(D(i,j)-1))\times(1-\alpha)(100+Va/100\times(V(i,j)-100))/100 \quad (4)$$

where α is the weight of distortion correction and vignetting correction over a value range of [0,1]. As the value of α increases, greater importance is attached to deterioration in image quality upon distortion correction. Also, Da is the amount of correction regarding distortion correction (%), Va is the amount of correction regarding vignetting correction (%), and V(i,j) is the vignetting correction characteristics value (the rate of increase in gain (%)) corresponding to the coordinate position (i,j). Moreover, D(i,j) is a distortion correction characteristics value given by:

$$D(i,j)=C(l)/l \quad (5)$$

where l is the image height at the coordinate position (i,j), and C(l) is the ideal image height for the image height l.

In the fifth embodiment, for the sake of simplicity, distortion correction and vignetting correction have been exemplified as lens aberration correction/perspective correction processes. However, perspective correction and magnification chromatic aberration correction may be added to them, as a matter of course. Note especially that the magnification chromatic aberration corresponds to the magnification ratios for R and B signals in relation to the distortion aberration of a G signal, when R, G, and B signals are used, and therefore can be corrected in the same way as in distortion correction.

As has been described above, according to the fifth embodiment, error evaluation of an overlapping region is more appropriately performed in consideration of the lens characteristics value and the amount of lens aberration correction in this error evaluation, thereby making it possible to improve the accuracy of the image correction process result.

<Modification to Fifth Embodiment>

The above-described fifth embodiment has given an example in which the amount of deterioration in image quality upon lens aberration correction is taken into consideration based on an error evaluation function and deal with the deterioration. However, a method of applying a filter corresponding to the amount of lens aberration correction is also possible. The following two types are possible as this filter.

The first filter blurs an image in accordance with the amount of correction. This method is effective to deal with noise enhancement by vignetting correction. The use of such a filter allows error evaluation of an overlapping region corresponding to deterioration in image quality upon a lens aberration correction process, thereby allowing an image connection process with higher accuracy.

The second filter restores deterioration in image quality. In this case, data on image quality deterioration characteristics due to factors associated with an image capturing optical system and lens aberration correction is compiled in advance, and an image is corrected based on the data on the image quality deterioration characteristics. This data on image quality characteristics can be represented by, for example, a PSF (Point Spread Function). A PSF describes the width to which a point image to be mapped is spread. The two-dimensional distribution of an image obtained by capturing an illuminant with a very small volume in the dark, for example, corresponds to a PSF. A point light source need not always be captured in practice to obtain a PSF, and a PSF can be calculated from lens design data or correction process contents. It is often the case that a correction process that uses a PSF adopts a large spatial filter. The use of a correction process which takes into consideration the process of deterioration in image quality as in this case makes it possible not only to cope with deterioration in image quality upon lens aberration correction but also to cope with a decrease in resolution due to factors associated with an optical system. Hence, a process of comparing overlapping regions free from any deterioration in image quality can be performed, thereby making it possible to execute an image connection process with higher accuracy.

<Other Embodiments>

Each of the above-mentioned first to fifth embodiments has given an example in which the camera position is estimated upon independently changing all estimation parameters. However, the amount of calculation can also be reduced by improving the hardware driving accuracy. For example, by attaching an encoder to the electric panhead, the panhead rotation direction can be obtained with a predetermined accuracy. In such a case, the number of parameters which define the camera position to be estimated can be smaller than six parameters which include position coordinates on a three-dimensional space and rotation directions about respective axes, as described in the first to fifth embodiments. That is, in this case, the camera position on a three-dimensional space can be described by the panhead direction vector pointing in the camera direction, and its norm (shooting distance). A total of four parameters: the shooting distance and the yaw, pitch, and roll describing the camera orientation will be estimated at this time. If an optimal solution is searched for in a round-robin fashion upon changing each parameter in ±100 steps, as in the first embodiment, 64 trillion evaluation value calculations are necessary for six parameters, while the number of times of evaluation value calculation can be decreased to only 1.6 billions for four parameters. It is noted that it will be a realistic practice to search for an optimal solution using simulated annealing or hill climbing rather than a round-robin method. Even in this case, the amount of calculation per error evaluation calculation operation can be greatly reduced.

In this manner, the number of estimation parameters can be decreased to speed up the process involved by adding a predetermined feature to the hardware configuration of an image capturing system. Especially by limiting the rotation direction, a position on a three-dimensional space can be decomposed to a direction vector and a norm. This makes it possible to search for an optimal solution only by norm estimation.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298823, filed Dec. 28, 2009, which is hereby incorporated by reference herein in its entirety.

What is claimed is:

1. An image processing apparatus comprising:
an acquisition unit configured to acquire a plurality of captured images captured by an image capturing apparatus, wherein a captured area for each of the plurality of captured images overlaps with a captured area for at least another one of the plurality of captured images;
a determination unit configured to determine position information of the image capturing apparatus, which has captured the plurality of captured images, for each of the plurality of captured images so that an evaluation value becomes smaller; and
a connecting unit configured to connect the plurality of captured images projected onto a reconstruction plane using the determined position information of the image capturing apparatus,
wherein said determination unit comprises;
a setting unit configured to set the position information of the image capturing apparatus for each of the plurality of captured images, and
a calculation unit configured to project each of the plurality of captured images onto the reconstruction plane based on the set position information, and to calculate, as the evaluation value, an image difference between the projected images in a overlapping region between the projected images, and
said determination unit is further configured to calculate the evaluation value while changing the position information of the image capturing apparatus.

2. The apparatus according to claim 1, wherein said calculation unit is further configured to perform an aberration correction process for the plurality of captured images, and projects the captured images having undergone the aberration correction process onto the reconstruction plane.

3. The apparatus according to claim 1, wherein said determination unit is further configured to sequentially select a captured image as an image to be processed, from an image captured at a shorter shooting distance, and to determine the position information of the image capturing apparatus for the image to be processed, thereby sequentially determining the position information of the image capturing apparatus for each of the plurality of captured images.

4. The apparatus according to claim 1, wherein
said determination unit is further configured to determine, based on the number of captured images, whether
the position information of the image capturing apparatus for each of the plurality of captured images is to be sequentially determined, by means of determining the position information of the image capturing apparatus for each of images, which is sequentially selected as an image to be processed from the plurality of captured images, or
the position information for each of the plurality of captured images is to be determined at once while changing the position information for each of the plurality of captured images.

5. The apparatus according to claim 1, wherein
the image capturing apparatus is mounted on an electric panhead, and
said setting unit is further configured to set the position information of the image capturing apparatus, based on control information for the electric panhead and position information obtained from the image capturing apparatus.

6. The apparatus according to claim 1, wherein
said determination unit is further configured to include
a first estimation unit configured to estimate a first parameter constituting the position information of the image capturing apparatus, wherein the first parameter is common to all of the plurality of captured images, and
a second estimation unit configured to estimate a second parameter constituting the position information of the image capturing apparatus, wherein the second parameter is different for each of the plurality of captured images, and said first estimation unit is further configured to estimate the first parameter based on selected one or more of a plurality of the overlapping regions between the projected images.

7. The apparatus according to claim 6, wherein said first estimation unit is further configured to select the overlapping regions which have higher edge intensity, as the overlapping region to be used to estimate the first parameter.

8. The apparatus according to claim 1, wherein said calculation unit is configured to place the captured image at a position of an object so as to straightly face the image capturing apparatus, and to project the placed image onto the reconstruction plane.

9. An image processing method comprising the steps of:
    acquiring a plurality of captured images captured by a camera in different positions, wherein at least a part of the captured images overlaps;
    setting camera position information each corresponding to each of the plurality of captured images;
    projecting each of the plurality of captured images onto a reconstruction plane based on the set camera position information;
    calculating a difference between the plurality of projected images in a overlapping region;
    determining the camera position information each corresponding to each of the plurality of captured images, by means of repeating the setting step, the projecting step and the calculating step so that the difference becomes smaller; and
    connecting the plurality of captured images by means of projecting the plurality of captured images onto the reconstruction plane using the determined camera position information each corresponding to each of the plurality of captured images.

10. A storage medium storing a program for causing a computer to execute each step of an image processing method defined in claim 9.

* * * * *